United States Patent [19]

Meins et al.

[11] Patent Number: 4,812,757
[45] Date of Patent: Mar. 14, 1989

[54] METHOD AND DEVICE FOR ACCURATELY DETERMINING THE DISTANCE OF A MAGNETIC SENSOR FROM A CONDUCTIVE REACTION RAIL

[75] Inventors: Jürgen Meins, Baldham; Helmut Grosser, Heringen, both of Fed. Rep. of Germany

[73] Assignee: Thyssen Industrie AG, Fed. Rep. of Germany

[21] Appl. No.: 927,755

[22] Filed: Nov. 5, 1986

[51] Int. Cl.$^4$ .................. G01B 7/14; G01N 27/72; G01R 33/00; B60L 13/06
[52] U.S. Cl. .................................. 324/207; 324/225; 324/262; 104/284
[58] Field of Search ............... 324/207, 208, 233, 225, 324/262, 202; 104/284

[56] References Cited

U.S. PATENT DOCUMENTS

| | | | |
|---|---|---|---|
| 3,609,527 | 9/1971 | Ellis | 324/207 |
| 3,849,724 | 11/1974 | Ghibu et al. | 324/207 |
| 4,365,196 | 12/1982 | Finch | 324/207 |

FOREIGN PATENT DOCUMENTS

| | | |
|---|---|---|
| 0148312 | 7/1985 | European Pat. Off. . |
| 1184101 | 11/1968 | Fed. Rep. of Germany . |
| 2411139 | 9/1975 | Fed. Rep. of Germany . |
| 2265046 | 1/1976 | Fed. Rep. of Germany . |
| 2503560 | 8/1976 | Fed. Rep. of Germany . |
| 2803877 | 8/1979 | Fed. Rep. of Germany . |
| 3143512 | 5/1983 | Fed. Rep. of Germany . |
| 3244420 | 6/1984 | Fed. Rep. of Germany . |
| 3527619 | 8/1986 | Fed. Rep. of Germany . |

Primary Examiner—Reinhard J. Eisenzopf
Assistant Examiner—Walter E. Snow
Attorney, Agent, or Firm—McGlew & Tuttle

[57] ABSTRACT

In magnetic bearings and magnetic suspension devices, sensors (4), as they are used for bearing regulation of support and guide magnets in magnetic transportation technology, continuously measure the distance of a magnet (6) from a reaction rail (7), in order to obtain a signal with which the magnet (6) is controlled with regard to the energizing current in such a way that it remains suspended at the predetermined distance. In known devices, there is no accurate monitoring of the sensor signal, which can result in faulty regulation of the excitation if the sensor signal is faulty, which represents a significant safety risk. Accurate monitoring of the sensor function, in addition to the distance measurement, is acheived by having, in addition to the measurement coil (1) to which alternating voltage is applied, a second reference coil (2), which has only a slight magnetic coupling with the rail (7) and to which the same voltage as the measurement coil is applied, and that the difference current of the two coils is used to measure the distance and the difference current when an additional impedance is periodically switched in is used to check the device.

21 Claims, 6 Drawing Sheets

METHOD AND DEVICE FOR ACCURATELY DETERMINING THE DISTANCE OF A MAGNETIC SENSOR FROM A CONDUCTIVE REACTION RAIL

FIELD AND BACKGROUND OF THE INVENTION

The present invention relates in general to magnetic transporation technology, and in particular to a new and useful method and device for accurately determining the distance from a reaction rail of a magnetic suspension railroad.

The invention concerns a method and a device for accurately determining the distance of a magnetic sensor from a conductive reaction rail, where the sensor has a measurement coil which has alternating voltage applied to it, and the coil current, which is dependent on the distance of the measurement coil from the reaction rail, is used to measure the distance. Particularly in magnetic bearings and magnetic suspension devices, as they are used for bearing regulation of support and guide magnets in magnetic transportation technology, the distance of the magnet must be continuously measured, in order to obtain a signal with which the magnet is controlled in such a way, with regard to the energizing current, that it remains suspended at the predetermined distance. Contact free measurement of a distance has already been studied in many ways.

According to a method known from German OS-28 03 877 the magnetic coupling of two coils, which is dependent on the distance, is utilized. But a disadvantage here is the great sensitivity with regard to the frequency which energizes the coils since the coils are operated in a resonance circuit with feed at a fixed frequency. Because of a low useful signal, this arrangement is sensitive to external electrical and magnetic interference fields.

The method described in German OS No. 32 37 843 uses ferromagnetic material to gude the magnetic flow within the sensor. This results in an influence of the sensor properties caused by external magnetic fields and a restriction to measurement of the distance relative to a ferromagnetic reaction rail.

The device described in German OS No. 29 16 289, to measure the air gap size, covers a large area of the grooved reaction rail and therefore has the disadvantage of large geometrical dimensions.

All of the known methods and devices have one thing in common, which is that no accurate monitoring of the sensor signal for distance takes place. This has the result that in case of an error within the sensor, the senso signal can take on a value which corresponds to a large distance of the sensor from the reaction rail, while in fact the distance is small.

Depending on the use and application of the sensor, this can result in restrictions or even in conditions that are critical for safety.

If the distance measurement is used in a magnetic suspension device, the error that although the mechanical distance is small, a signal corresponding to a large distance is given off, would lead to greater excitation of the magnet, in order to decrease the distance, thereby leading to contact between the magnet and the magnet reaction rail, with high magnetic pressure force. This represents a significant safety risk.

SUMMARY OF THE INVENTION

It is the task of the present invention to develop a method and a device of the type described initially, in which accurate monitoring of the sensor function takes place, in addition to the distance measurement.

This task is solved in the case of the method of the type described initially in that a second reference coil, which has only a slight magnetic coupling with the rail, has the same voltage applied to it as the measurement coil, and that to measure the distance, the difference current is formed from the current in the measurement coil and the current in the reference coil in a measurement mode, and that an additional impedance is periodically switched into the measurement coil circuit and into the reference coil circuit in a test mode. Because of the fact that the reference coil has only a slight magnetic coupling with the rail, the current which is formed in the reference coil circuit is independent of the rail distance. Since the same voltage is applied to the reference coil and the measurement coil, and the current of the reference coil is independent of the distance, the difference current, formed from the current in the measurement coil and the current in the reference coil, can act as a measurement valve for the distance. The measurement coil current is reduced by switching in the additional impedance into the measurement coil circuit, making it essentially independent of the distance. Switching in the additional impedance into the circuit of the reference coil reduces the reference coil current accordingly. This makes the test mode essentially independent of the distance. When the total arrangement is working without errors, the difference current in the test mode is characterized by a certain value which only changes slightly with the distance, so that errors which occur and which make themselves felt by a corresponding deviation can be detected. It is also advantageous with this arrangement that because the current difference is formed from the measurement coil and the reference coil, the influence of temperature on the coil resistances is essentially eliminated.

In detail, the method can be advantageously achieved as follows:

A good possibility of adapting the sensor signals to various materials of the reaction rail is created if the active portion and the reactive portion of the difference current are separated, rectified and subsequently equalized smoothed by a switch which is controlled in the cycle of the applied voltage.

Grooves in the reaction rail result in oscillations in the difference current, both for the active portion and for the reactive portion. These oscillations of the signal, which is composed of the two portions, can be minimized by weighting the active and the reactive portion of the difference current in such a way that the influence of the grooves-standing waves-is equally great and in opposite directions in both portions and that the total signal, which is composed of the two weighted portions, demonstrates a minimum influence of the grooves, relative to a certain output signal. The conditioning here takes place by amplifying or attenuating by a factor which is determined only by the geometrical conditions, but is constant over time.

To test the circuit, the output signal is checked for adherence to a predetermined tolerance range in the switching phase in which the impedances are switched in. If this value is outside the tolerance range, then the sensor is defective, and a signal for de-excitation of the magnet is formed.

The additional impedances are dimensioned in such a way that the output signal is the same in the measurement and test mode at a certain, minimum distance. This distance is determined in such a way that a safety distance from the reaction rail is always maintained.

If the output signal is equal to or less than the minimum distance in the measurement mode, a signal for de-excitation of the magnet is also formed in this case.

Safety with regard to error recognition is increased if two sensor arrangements are operated, with the following chain sequence: The additional impedances are switched in synchronously and the signal for switching in the impedance of the first sensor is checked with regard to freedom from errors with the output signal of the second sensor. The signal for switching in the impedance of the second sensor is checked with regard to freedom from errors with the output signal of the first sensor. A signal for freedom from errors of the entire measurement arrangement is formed from both signals.

Instead of working with two sensors which are spatially separate, it is possible to work, in an advantageous manner, with the sensors brought together in the same space, where decoupling of the coils of the first sensor from the coils of the second sensor is achieved by operating the coils of the first sensor with a different frequency from the coils of the second sensor.

Decoupling of the coils can also be achieved by the geometrical structure of the coils and/or the arrangement of the coils relative to one another.

An advantageous device for carrying out the method is structured as follows:

A measurement coil is attached in the opening plane of a conductive housing which is open in the direction of the reaction rail. A second coil, which acts as the reference coil, is attached in the housing below the measurement coil. An alternating current source acts to supply power to both coil circuits. In the measurement coil circuit and in the reference coil circuit, an additional impedance is switched in, with a bridging switch wired in parallel. A difference current measurement site is switched into a portion of the circuit which is common to the measurement coil and the reference coil.

The conductive housing, which is open in the direction of the reaction rail, shields the mesurement coil against alternating magnetic fields which surround it. The opening relative to the reaction rail allows coupling to the reaction rail. Because the reference coil is attached in the housing, below the measurement coil, it is in the shielded space and is also decoupled relative to the rail with the measurement coil. The synchrounous switch, which bridges the additional impedances periodically and simultaneously, allows alternate sampling of the measurement signal and the test signal at the difference current measurement site, so that constant monitoring is guaranteed.

In detail, the device can be advantageously structured as follows:

Because of the fact that the reference coil has a smaller coil diameter than the measurement coil, the magnetic coupling of both coils to the housing can be made approximately the same, where the Ohm feedback and also the inductive feedback to the coils are made approximately the same, because the currents induced by the two coils in the housing are approximately the same, so that the electrical behavior of the coils is approximately the same.

Because of the fact that the measurement coil is wound in the form of a loop with one winding direction and the reference coil is wound in the form of a coil with an alternating winding direction, the measurement coil and the reaction coil can be decoupled from one another in a simple manner.

Accordingly, an object of the present invention is to provide a method for accurately determining the distance of a magnetic sensor from a conductive reaction rail, where the sensor includes a sensor coil to which an alternating voltage is applied and through which a sensor coil current passes which is dependant on the distance of the sensor coil from the reaction rail, comprising providing a reference coil so that it is only slightly magnetically coupled to the reaction rail, applying the same alternate voltage to the reference coil as to the sensor coil, a reference coil current passing through the reference coil, taking the difference between the reference and sensor coil currents as a measurement of the distance of the magnetic sensor from the reaction rail, and periodically switching an additional impedance into each of the sensor coil and reference coil, and measuring a difference in current caused by the switching in of the additional impedance to test the sensor and reference coils.

A further object of the invention is to provide a device for carrying out the method wherein a sensor coil and a reference coil are mounted in a housing, the sensor coil closely magnetically being coupled to the reaction rail and the reference coil being slightly magnetically coupled to the reaction rail, an alternating current source connected to each of the coils, an additional impedance associated with each of the coils and a switch for periodically connecting each of the additional impedances with each of the coils.

A still further object of the invention is to provide a device for measuring the distance between a magnetic sensor and a reaction rail, and for determining the functional state of the sensor, which is simple in design, rugged in constructions and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the following, an embodiment of the invention is explained, on the basis of the drawings, wherein.

DESCRIPTION OF THE PREFERRED EMBODIMENT

Figure 1:
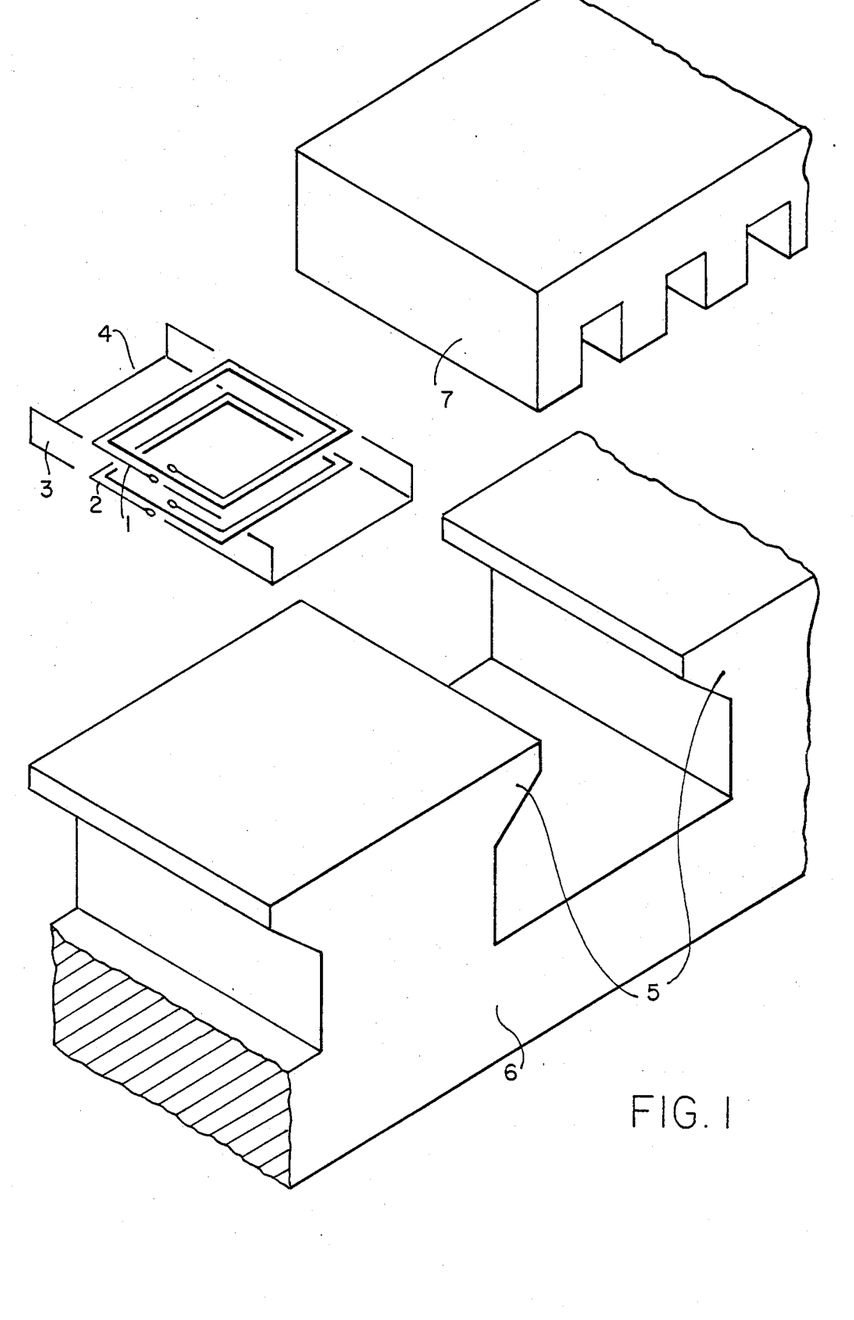
FIG. 1 is a perspective, exploded, schematic view of a distance sensor consisting of a sensor coil, and a reference coil.

In the embodiment shown schematically in FIG. 1, a sensor 4 is arranged between the poles 5 of the electromagnet 6 in such a way that a sensor coil of the sensor is facing a ferromagnetic reaction rail 7, relative to which the distance is to be determined. A reference coil 2, which is also arranged in the sensor 4, faces a metallic screen or housing 3 and is therefore not subject to the influence of the reaction rail 7. In addition, the metallic screen 3 has the task of shielding the magnetic field of the sensor 4 in the direction of the magnet 6, whose coils are not shown, in order to obtain a sensor signal which is independent of the installation situation of the sensor 4 in the magnet 6.

The sensor coils 1 and 2 are preferably formed with printed circuit technology.

Figure 2:
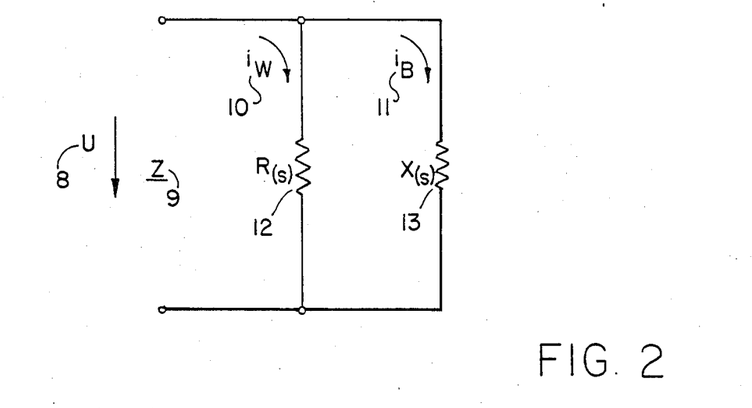
FIG. 2 is an electrical equivalent circuit diagram of a sensor coil with the distance-dependent ohmic resistance and the distance-dependent total inductivity.

FIG. 2 shows the electrical equivalent circuit diagram of one of the two sensor coils 1 or 2 according to FIG. 1. It contains the active resistor R (s), 12 which is dependent on the distance s and the temperature $t_X$ in the case of the sensor coil 1, and exclusively dependent on the temperature $t_X$ in the case of the sensor reference coil 2, and it contains the reactive resistor X(s), 13, which is dependent on the distance s in the case of the coil 1 and independent of the distance 2 in the case of the coil 2. The total impedance $\underline{Z}$, 9 is formed from the parallel circuit of the active resistor R(s), 12 and the reactive resistor X(s), 13. When a voltage $\underline{U}$, 8 is applied, an active current $i_W$, 10 results through the active resistor R(s), and a reactive current $i_B$, 11 results through the reactive resistor X(s).

R(s) is the active resistance or active component of the total impedance Z of the coil, whereas X(s) is the reactive component of the total impedance Z. The active component being pure ohmic having a current $i_W$ flowing through R(s) such that $i_W = U/R(s)$ where $i_W$ is the current U is the voltage and R(s) the ohmic resistance. The current $i_W$ is the active current and is in phase with the voltage.

A reactive impedance X(s) has a reactive current $i_S$ flowing therethrough. A reactive component of current is, in the phaser representation of quantities in an alternating current circuit, the component which does not contribute power, and which results from inductive or capacitive reactance in the circuit. Contrary to a resistor, current and the voltage of a coil or a capacitor are not in phase, but out of phase. As is clear from FIG. 2, the current $i_W$ is the active current flowing through the branch of the equivalent circuit having the ohmic resistance R(s). The current $i_S$ is the reactive current flowing through the branch of the equivalent circuit having the reactive resistance X(s). In phaser representation of alternating current, the component of current perpendicular to the voltage, which contributes no power but increases the power losses of the system, is the reactive current.

The formal relationship of these electrical values is indicated by the following equations:

$$i_W = \frac{U}{R_{(s)}}$$

$$i_B = \frac{U}{X_{(s)}}$$

Figure 3:
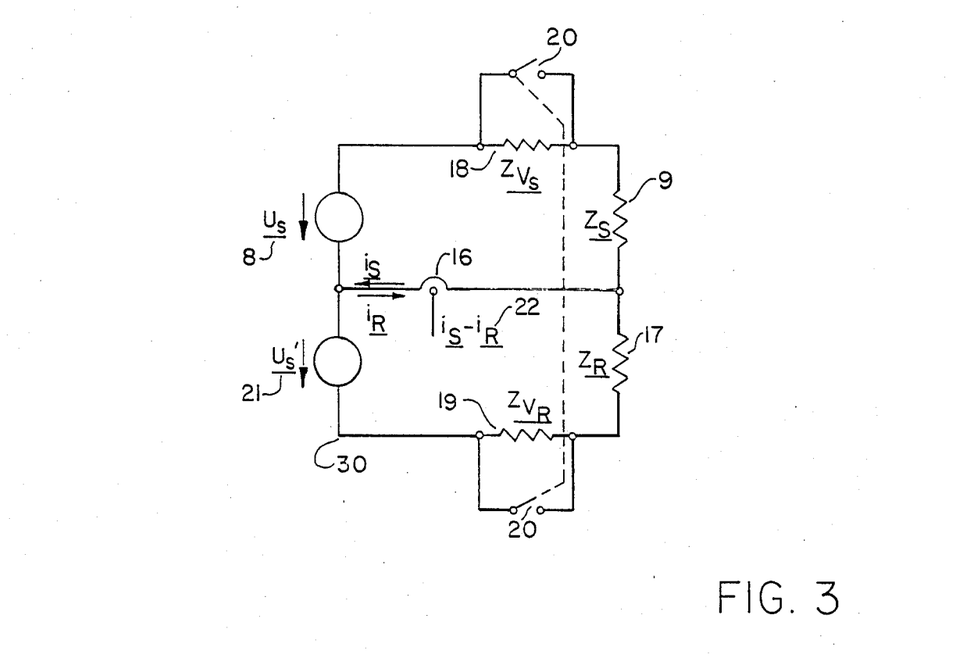
FIG. 3 is a basic electrical wiring diagram of the supply to the sensor coil, the reference coil, the switchable additional inductivities and the arrangement of the difference current measurement site.

The electrical connections of the individual components are shown in FIG. 3. The sensor coil 1 with the impedance $Z_s$, 9 forms a closed electrical circuit with an additional impedance $Z_{VS}$, 18, a switch 20, a supply voltage 8 and a difference current measurement site 16.

In the same way, the reference coil 2, with the impedance $Z_R$, 17, the additional impedance $Z_{VR}$, 19, the switch 20, the supply voltage 21 and the difference current measurement site 16, form another electrical circuit. Both circuits are connected with one another via the difference current measurement site 16 in such a way that the difference current $i_S - i_R$, 22 is detected at the current measurement site 16 on the basis of the indicated phase positions of the voltages $U_s$, 8 and $U_s$, 21.

The "meeasurement" mode equation is:

$$i_S - i_R = U_s \left[ \frac{1}{Z_S} - \frac{1}{Z_R} \right].$$

The "test" mode equation is:

$$i_S - i_R = U_s \left[ \frac{1}{Z_R + Z_{VS}} - \frac{1}{Z_R + Z_{VR}} \right].$$

The circuit arrangement has a difference current signal $i_S - i_R$, 22 and the supply voltage $U_s$, 8 applied to it.

Figure 4:
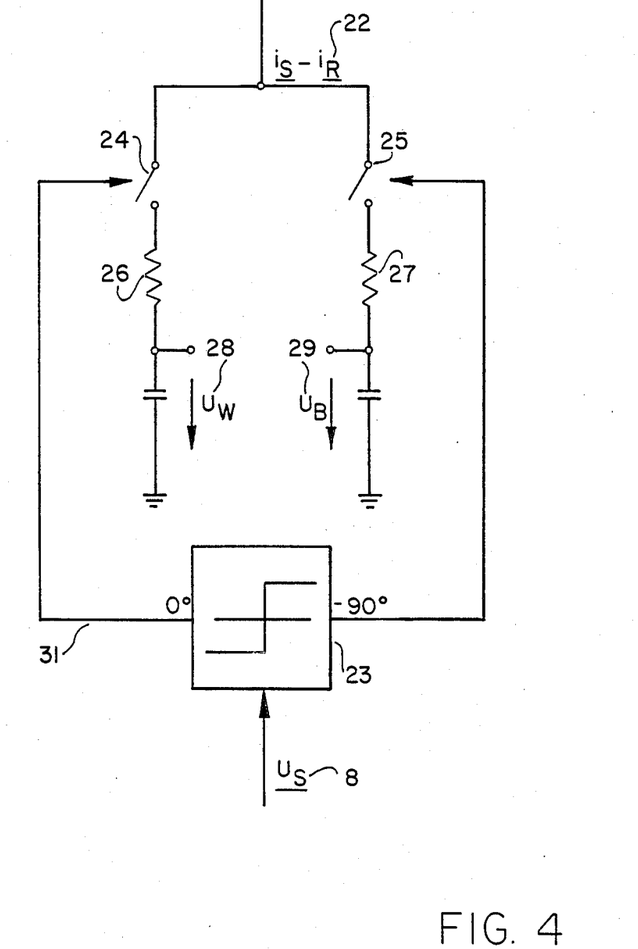
FIG. 4 is a schematic circuit arrangement for separate determination of the feedback to the active and the reactive component of the sensor coil impedance, which is dependent on the distance.

FIG. 4 shows a circuit arrangement to determine direct voltage signals corresponding to the active and the reactive component of the difference current $i_S - i_R$.

In FIG. 4, the difference current signal $i_S - i_R$ is applied to a switch 24 for demodulation of the active portion of the difference current and to the switch 25 for demodulation of the reactive portion of the difference current. The corresponding switching switching signals are derived from the supply voltage 8 in a comparator 23. A rectangular signal which is in phase with the supply voltage 8 controls the switch 24. A rectangular signal lagging by 90% (out of phase by 90% with respect to the voltage supply) controls the switch 25. The output signal of the switch 24 is rectified and smoothed in a filter 26 and supplies the signal $U_W$, 28 corresponding to the active component of the difference current. The output signal of the switch 25 is rectified and smoothed in a filter 27 and supplies the signal $U_B$, 29, corresponding to the blind component of the difference current.

Figure 5:
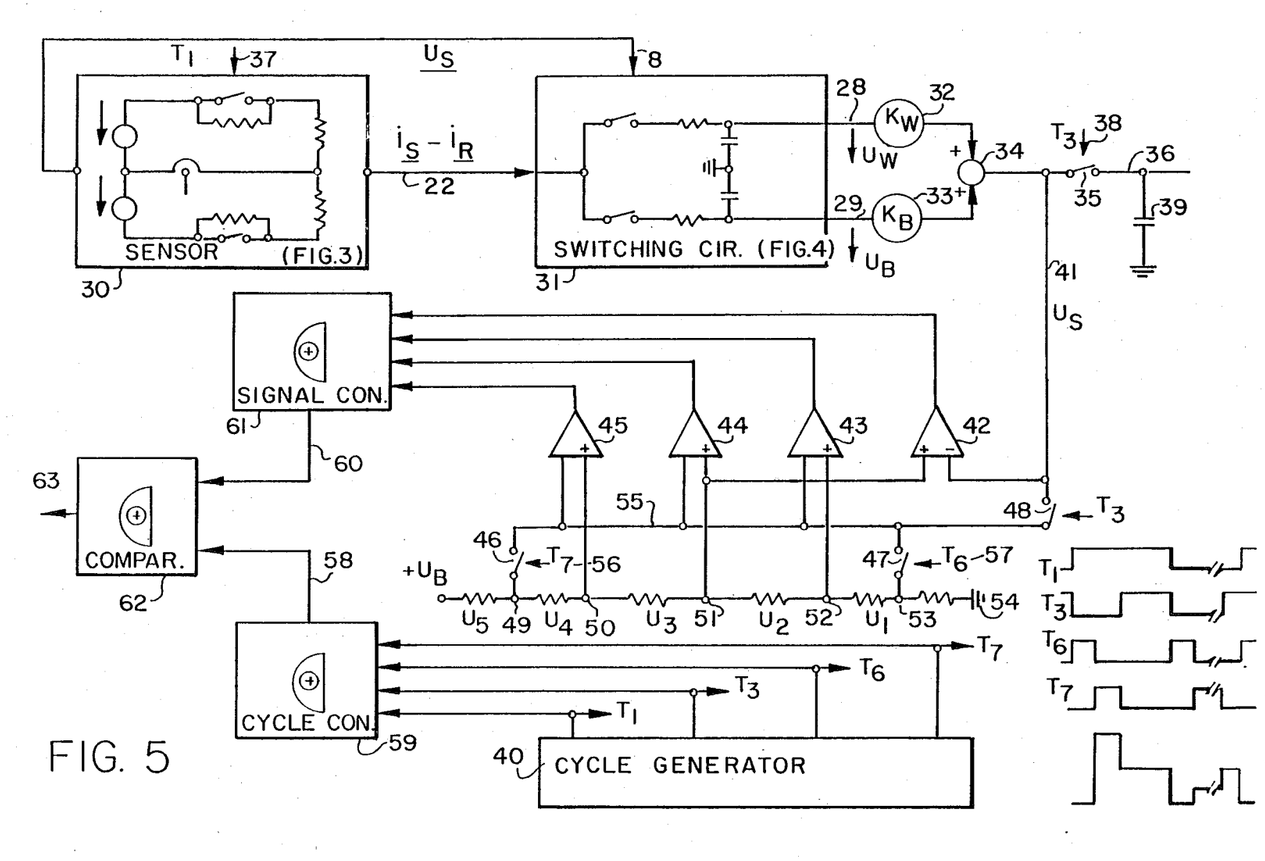
FIG. 5 is a schematic arrangement for accurate monitoring of the sensor function and going below a certain minimum distance which has been set, by cyclic alternation of the "measurement" and "test" modes.

FIG. 5 shows a schematic representation of the connections of a sensor 30 corresponding to FIG. 3, a wire arrangement 31 according to FIG. 4, an addition circuit for evaluation and addition of the signals $U_W$, 28 and $U_B$, 29 and additional modules for accurate monitoring of the sensor function and going below a predetermined minimum distance.

Grooves in the reaction rail result in oscillations in the difference current, both for the active portion and for the reactive portion of the difference current. These oscillations of the signal, composed of two portions, can be minimized by conditioning the active and the reactive portion of the difference current in such a way that the influence of the grooves-standing waves is equally great and in opposite directions in both portions and that the total signal, which is composed of the two conditioned portions, demonstrates a minimum influence of the grooves, relative to a certain output signal. This conditioning takes place by amplifying or attenuating the active and the reactive portion of the difference current by a factor which is determined by the geometrical conditions (such as the material used) but is constant over time. The amplification or attenuation by a factor is done such that the influence of the grooves of the one signal has a given value whereas the amplification factor of the other amplifier is selected such that influence of the grooves on the respective other signals has the same given value but with an opposite side. When these signals are added at the summation site 34 the portions of both signal substantially cancel each other out.

The addition circuit contains coefficient elements 32, 33 and a summation site 34. The significance of the addition circuit results from the fact that the grooves arranged in the reaction rail 7 according to FIG. 1 exert a varying influence on the signals $U_W$, 28 and $U_B$,29, with the influence dependent on the distance, however, being the same for both signals. A minimum grooving influence results from evaluation by the coeeficients $K_W$, 32 and $K_B$, 33, which is attuned to the grooves. The switching element 35 is controlled by the signal $T_3$, 38 and forms a stop or hold element, in combination with a capacitor 39, so that a continuous distance signal 36 is formed at the output of this switching device.

The principle of accurate monitoring of the sensor function consists of excitation of the sensor by the switching signal $T_1$, 37, which is produced in the cycle generator 40, and comparison of an impulse pattern formed from the excitation response of the sensor with an impulse pattern formed from the excitation itself. For this, the switches 20 are periodically confirmed or closed with the signal $T_1$, 37, according to FIG. 3. As a result of this, there is a periodic change in the current difference value $i_s - i_R$, 22 between the current measurement value, which is dependent on the distance, and a fixed value set by the additional impedances $A_{VS}$ 18 and $A_{VR}$ 19, which corresponds to a predetermined minimum distance. This periodic change is reflected in the output signal $U_s$, 41 of the summation site 34. The signal $U_x$, 41 is passed to a comparator 42. In the comparator, a comparison with the voltage 51 applied to the register network 54 takes place. Furthermore, a signal pattern 55 is produced via the switches 46, 47, 48 and passed to the comparators 43, 44 45.

In the comparators, a comparison of the signal pattern 55 with the voltages $U_4$,50; $U_3$,51; and $U_2$,52 applied to the resistance divider 54 takes place.

Figure 6:
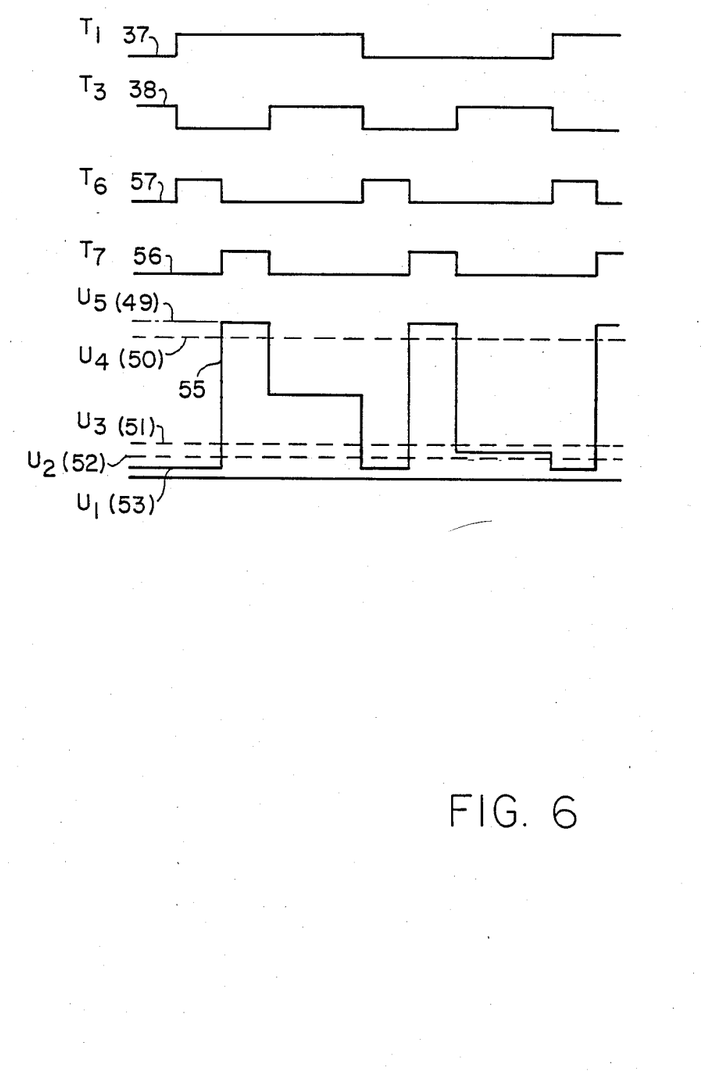
FIG. 6 is a graph showing the cycle and signal pattern over time which is required for accurate function and minimum distance monitoring.

The time progression of the signals is shown in FIG. 6. During the cycle $T_6$,57, the signal 55 takes on the value of $U_1$,53 via the closed switch 47. This checks the resistance divider 54 with regard to whether or not the voltage $U_1$, 53 is below the threshold formed by $U_2$,52.

During the cycle $T_7$,56, the signal 55 takes on the value of $U_5$,49. This checks the resistance divider 54 with regard to whether or not the voltage $U_5$,49 is above the threshold formed by $U_4$,50. During the cycle $T_3$,38, the signal 55 takes on the value $U_s$,41. This checks whether or not the sensor output signal lies within the working range characterized by the thresholds, $U_3$,51 and $U_4$,50.

In the "test" mode, there is the same signal progression during the cycles $T_6$,57 and $T_7$,56 as in the "measurement" mode. During the cycle $T_e$,38, there is a check as to whether or not the sensor signal $U_s$,41 lies within the range characterized by the thresholds $U_2$,52 and $U_3$,51. This results in a check of the sensor 30 and the switching circuit 31 with regard to electrical properties.

The cycle pattern $T_1$,37; $T_3$,38; $T_6$,57; and $T_7$,56 shown in FIG. 6 are generated in the cycle generator 40. The actual check of the sensor function is carried out by formation of a cycle pattern 58 in a connecting circuit 61, with a subsequent comparison of the cycle pattern 58, 60 in a comparison circuit 62. The comparison circuit 62 supplies a logic output signal 63, which changes its status if the minimum distance is less than the set minimum, or in case of sensor errors.

Figure 7:
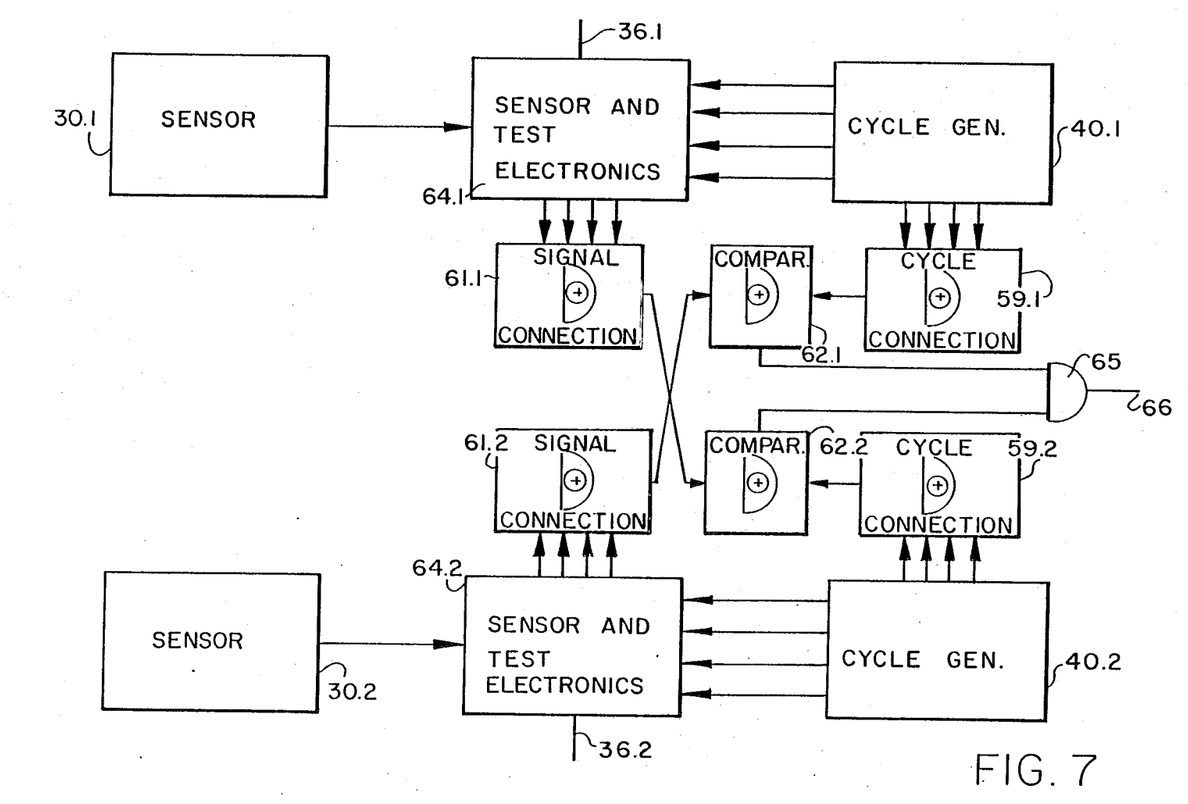
FIG. 7 is a block diagram showing an expanded circuit arrangement for error recognition.

In FIG. 7, an expanded circuit arrangement with regard to the certainty of recognizing errors is shown. It contains two circuit arrangements, electrically independent of one another, according to FIG. 5, with one circuit arrangement containing a modular sensor 30.1., sensor and test electronics 64.1, cycle preparation 40.1, signal connection 61.1, cycle connection 59.1 and comparison circuit 62.1. For the other circuit arrangement, the corresponding designations 30.2, 64.2, 40.2,61.2, 59.2 and 62.2 apply. In addition, there is another connection circuit 65, whose output signal changes the logic status if one of the two circuit arrangements shows an error or if the minimum distance is not maintained.

This arrangement supplies the signals 36.1 and 36.2, which are both dependent on the distance.

While a specific embodiment of the invention has been shown and described in detail to illustrate the application of the principles of the invention, it will be understood that the invention may be embodied otherwise without departing from such principles.

What is claimed is:

1. A method for accurately determining the distance of a magnetic sensor from a conductive reaction rail having regular grooves, the sensor including a sensor coil which receives an alternating voltage and through which passes a sensor coil current which is dependent on the distance of the sensor coil from the reaction rail, comprising: providing a reference coil so that it is only slightly magnetically coupled to the reaction rail, applying the same alternating voltage to the reference coil as applied to the sensor coil for causing a reference coil current to pass through the reference coil, wherein each of the coils include an active resistance for passing an active current portion and a reactive resistance for passing a reactive current portion of the coil currents, providing a difference current between the sensor and the reference coil currents, the difference current having an active difference current portion and a reactive difference current portion, separating the active and reactive difference current portions, providing rectified and smoothed active and reactive signals therefrom said grooves causing fluctuations in the active and reactive signals as the sensor moves with respect to the reaction rail, minimizing said fluctuations by conditioning the active and reactive signals such that the influence of the grooves on said active and reactive signals is substantially equally great but in an opposite direction, adding the conditioned active and reactive signals together to form an output signal, periodically switching in and out an additional impedance to each of the sensor and reference coils during test and measuring periods to produce different sensor and reference coil currents, and using the output signal as a measurement of the operability of the sensor and as a measurement indicative of the distance of the sensor from the reactive rail.

2. A method according to claim 1, wherein, during the test periods, the output signal is compared to a predetermined tolerance r angle of values and, if outside the range of values, generating a control signal, which is usable to deactivate equipment responding to said sensor.

3. A method according to claim 1, wherein the additional impedances to be switched into the sensor and reference coils are dimensioned so that the output signal during the measuring periods and during the test periods is the same for a selected minimum distance between the sensor and the reaction rail.

4. A method according to claim 2, wherein the additional impedances to be switched into the sensor and reference coils are dimensioned so that the output signal during the measuring periods and during the test periods is the same for a selected minimum distance between the sensor and the reaction rail.

5. A method according to claim 2, wherein the control signal is generated when the output signal corresponds to a distance which is less than the selected minimum distance.

6. A method for accurately determining the distance of a magnetic sensor from a conductive reaction rail having regular grooves, the sensor including a sensor coil which receives an alternating voltage having a cycle rate and through which passes a sensor coil current which is dependent on the distance of the sensor coil from the reaction rail, comprising: providing a reference coil so that it is only slightly magnetically coupled to the reaction rail, applying the same alternating voltage to the reference coil as applied to th sensor coil for causing a reference coil current to pass through the reference coil, wherein each of the coils include an active resistance for passing an active current portion and a reactive resistance for passing a reactive current portion of the coil currents, providing a difference current between the sensor and reference coil currents, said difference current having an active difference portion and a reactive difference current portion, separating the active reactive difference current portions, rectifying and smoothing the active and reactive difference current portions and deriving respective active and reactive signals therefrom, said grooves causing fluctuations in the active and reactive signals as the sensor moves with respect to the reaction rail, minimizing said fluctuations by conditioning the active and reactive signals such that the influence of the grooves on said active and reactive signals is equally great but in an opposite direction and adding the conditioned active and reactive signals together to form an output signal as a measurement indicative of the distance between the sensor and the rail.

7. A method according to claim 6 wherein the active and reactive difference current portions are separated by means of switches operated at the cycle rate, one switch being controlled by a signal in phase with the alternating voltage for deriving one of the signals and the other switch being controlled by a signal lagging behind the alternating voltage by 90° for deriving the other signal.

8. A device for accurately determining the distance of a magnetic sensor from a reaction rail having regular grooves comprising: a sensor coil positioned to be largely magnetically coupled to the reaction rail, a reference coil positioned to be only slightly magnetically coupled to the reaction rail, alternating voltage means for applying alternating voltage having a cycle rate to each of the sensor coil and reference coil for causing coil currents having active and reactive current portions to pass through the sensor coil and reference coil, an additional sensor coil impedance and a reference coil impedance for each of the sensor coil and reference coil respectively, a sensor switch bridging the sensor coil impedance and a reference switch bridging the reference coil impedance each switch operable to add and to remove additional impedance to each of the sensor coil, each switch and reference coil respectively, means for synchronously operating the switch at the cycle rate of the alternating voltage, difference current measurement means connected to each of the sensor coil and reference coil for measuring a difference current between the sensor coil current and the reference coil current during measuring periods with the added impedance removed and for measuring a difference current between the sensor current and the reference coil current during test periods with the additional impedance added, said difference currents having active and reactive difference current portions, means for separating the active and reactive difference current portions and means for deriving rectified and smoothed active and reactive signals therefrom, the grooves causing fluctuations in the active and reactive signals as the sensor moves with respect to the reaction rail, means for minimizing said fluctuations by conditioning the active and reactive signals such that the influence of the grooves on said active and reactive signals is equally great but in opposite directions, and means for adding the conditioned active and reactive signals together to form an output signal as a measurement indicative of the distance between the sensor and the reaction rail and of the operating of the device.

9. A device according to claim 8, further comprising a threshold value producing means, comparator means coupled to said adding means and said threshold value producing means, and means controlling said threshold value producing means and said comparator means for checking whether or not during the measuring and test periods the output signal lies within working ranges defined by threshold values produced by said threshold value producing means.

10. A device according to claim 9, further comprising signal pattern producing means coupled to said first comparator means, cycling pattern producing means, and a comparison means coupled to said signal pattern producing means and to said cycling pattern producing means for producing a signal indicative of the device function.

11. A device according to claim 9 comprising a housing for carrying the sensor coil and the reference coil, said housing carrying the reference coil at a location further from the reaction rail than the sensor coil and forming a shield for the magnetic field of the sensor coil.

12. A device according to claim 9, wherein the reference coil is smaller in cross section than the sensor coil.

13. A device according to claim 9, wherein the sensor coil and reference coil are wound in opposite direction loops.

14. A device according to claim 10, further comprising: a second sensor coil, a second reference coil, a second alternating voltage means for applying the same alternating voltage as applied by said alternating voltage means to the second sensor and reference coils, a second impedance for each of the second sensor and reference coils, a second switch bridging each of the second impedances., a second means for synchronously operating the switch, a second difference current measurement means, second means for separating the active and reactive difference current portions and second means for deriving rectified and smoothed active and reactive signals therefrom, second means for weighing the active and reactive signals, second adding means, second threshold value producing means, second comparator means, second signal pattern producing means, wherein said comparison means (61,2) is provided which is coupled to said signal producing means (61,1) and to said second cycle pattern producing means (59,2), wherein a second comparison means (62,1) is provided which is coupled to said second signal pattern producing means (61,2) and to said first cycle pattern producing means (59,1) and wherein a connection circuit means (65) is coupled to said first and second comparison means for producing a signal giving notice of an error.

15. A device according to claim 14, wherein the sensor coil and reference coil are decoupled from the second sensor coil and second reference coil by the design of the coils.

16. A device according to claim 14, wherein the sensor coil and reference coil are decoupled from the second coil and second reference coil by the position of the coils relative to each other.

17. A device according to claim 14, wherein the sensor coil and reference coil are decoupled from the second sensor coil and second reference coil by operating the sensor coil and reference coil with a voltage having a first frequency and by operating the second reference coil and second sensor coil with a voltage having a second frequency differing from the first frequency.

18. A device for accurately determining the distance of a magnetic sensor from a reaction rail having regular grooves comprising: a sensor coil positioned to be largely magnetically coupled to the reaction rail, a reference coil positioned to be only slightly magnetically coupled to the reaction rail, means for applying the same alternating voltage having a cycle rate to each of the sensor coil and reference coil for causing coil currents having active and reactive portions to pass through the sensor coil and reference coil, a difference current portions to pass through the sensor coil and reference coil, a difference current measurement means connected to each of the sensor and reference coils for measuring a difference current between the sensor coil current and reference coil current, said difference current means having active and reactive difference current portions, means for separating the active and reactive difference current portions and for deriving rectified and smoothed active and reactive signals therefrom, said grooves causing fluctuations in the active and reactive signals as the sensor moves with respect to the reaction rail, means for minimizing said fluctuations by conditioning the active and reactive signals such that the influence of the grooves on said active and reactive signals in equally great but in opposite direction, and means for adding the conditioned active and reactive signals together to form an output signal as a measurement indicative of the distance between the sensor and the reaction rail.

19. A device according to claim 18, wherein said separating means includes switches operated at the cycle rate and means controlling one of said switches by a signal phase-equal with the alternating voltage for deriving one of the signals and the other switch by a signal lagging behind the alternating voltage by 90° for deriving the other signal.

20. A device for accurately determining the distance of a magnetic sensor from a reaction rail, comprising: at least one sensor coil positioned to be largely magnetically coupled to the reaction rail, means for applying an alternating voltage current to pass through the sensor coil, an additional impedance for the sensor coil, a switch bridging the additional impedance and operable to add and to remove the additional impedance to the sensor means for synchronously operating the switch at the cycle rate of the alternating voltage, a sensor coil current measurement means for measuring a first current through said at least one sensor coil during measuring periods with the added impedance removed and for measuring a second current through said at least one sensor coil during test periods with the additional impedance added, means for deriving rectified and smoothed output signals from said first and second currents as a measurement indicative of the distance between the sensor and the reaction rail and as a measurement indicative of the operability of the device, threshold value producing means, comparator means coupled to said deriving means and said threshold value producing means, and means controlling said threshold value producing means and said comparator means for checking whether or not during the measuring and test periods the output signal lies within working ranges defined by threshold values produced by said threshold value producing means.

21. A device according to claim 20; further comprising signal pattern producing means coupled to said comparator means, and a comparison means coupled to said signal pattern producing means and to said cycling pattern producing means for producing a signal indicative of an error in the functioning of the device.

* * * * *